(12) United States Patent
Ament

(10) Patent No.: US 6,299,540 B1
(45) Date of Patent: *Oct. 9, 2001

(54) TORSIONAL VIBRATION DAMPING DEVICE IN THE DRIVE TRAIN OF A MOTOR VEHICLE

(75) Inventor: Norbert Ament, Oerlenbach (DE)

(73) Assignee: Mannesmann Sachs AG, Schweinfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/344,776

(22) Filed: Jun. 25, 1999

(30) Foreign Application Priority Data

Jul. 8, 1998 (DE) .............................. 198 30 497

(51) Int. Cl.⁷ ....................................... F16D 3/66
(52) U.S. Cl. ....................... 464/68; 192/213.12
(58) Field of Search ................. 464/66, 67, 68; 192/213, 213.2, 213.11, 213.12, 213.21, 213.22; 74/574

(56) References Cited

U.S. PATENT DOCUMENTS

| | | | |
|---|---|---|---|
| 2,364,988 | * 12/1944 | McFarland | 464/68 |
| 3,138,039 | * 6/1964 | Zeidler et al. | 192/213.21 X |
| 3,362,194 | * 1/1968 | Bertelson et al. | 464/68 |
| 4,197,931 | * 4/1980 | Norcia | 464/68 X |
| 4,433,770 | * 2/1984 | Loizeau et al. | 464/68 X |
| 5,673,778 | * 10/1997 | Ament | 464/68 X |
| 5,697,846 | * 12/1997 | Uenohara | 464/68 X |
| 5,785,599 | 7/1998 | Reik | 464/68 |

FOREIGN PATENT DOCUMENTS 2 107 431 A 4/1983 (GB).

\* cited by examiner

*Primary Examiner*—Lynne H. Browne
*Assistant Examiner*—Greg Binda
(74) *Attorney, Agent, or Firm*—Cohen, Pontani, Lieberman & Pavane

(57) ABSTRACT

A torsional vibration damping device in the drive train of a motor vehicle has two coaxial cover plates which are rotationally connected and are kept at a distance apart. The two coaxial cover plates rotate about a common axis of rotation within a certain angular range relative to a coaxial internally located part arranged between the two cover paltes and the cover plates are elastically connected to the internally located part by a spring element which is effective in the circumferential direction. The cover plates are held apart by distance pieces applied transversely to the circumferential direction. Each distance piece has a joint region where the distance piece is connected to the cover plate and a connecting region which traverses the distance between the cover plates. The radial distance between the joint region and the axis of rotation differs from the radial distance between the connecting region and the axis of rotation.

19 Claims, 4 Drawing Sheets

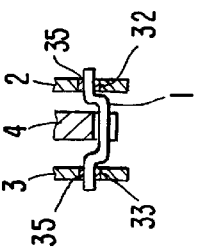
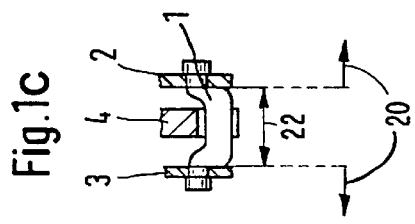
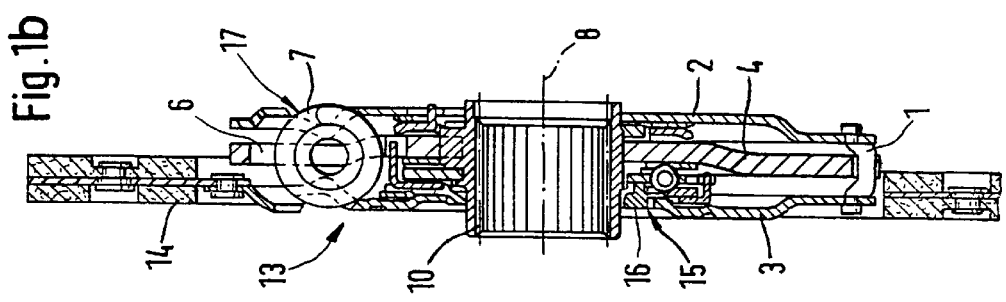
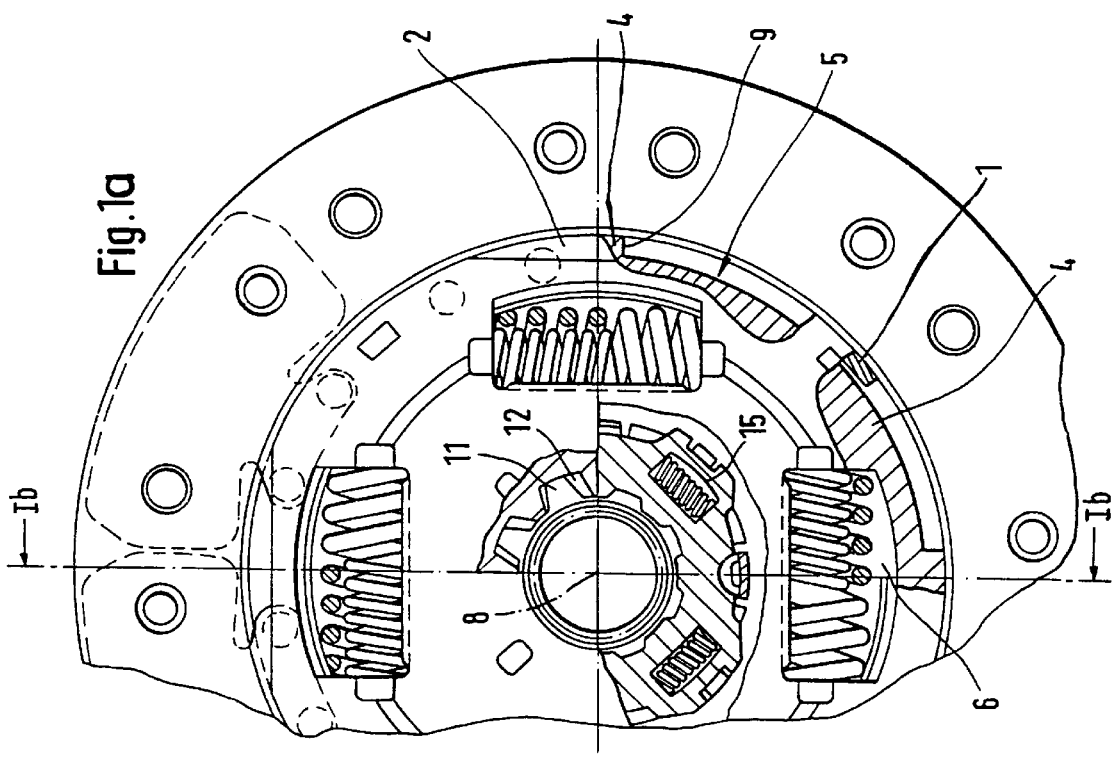

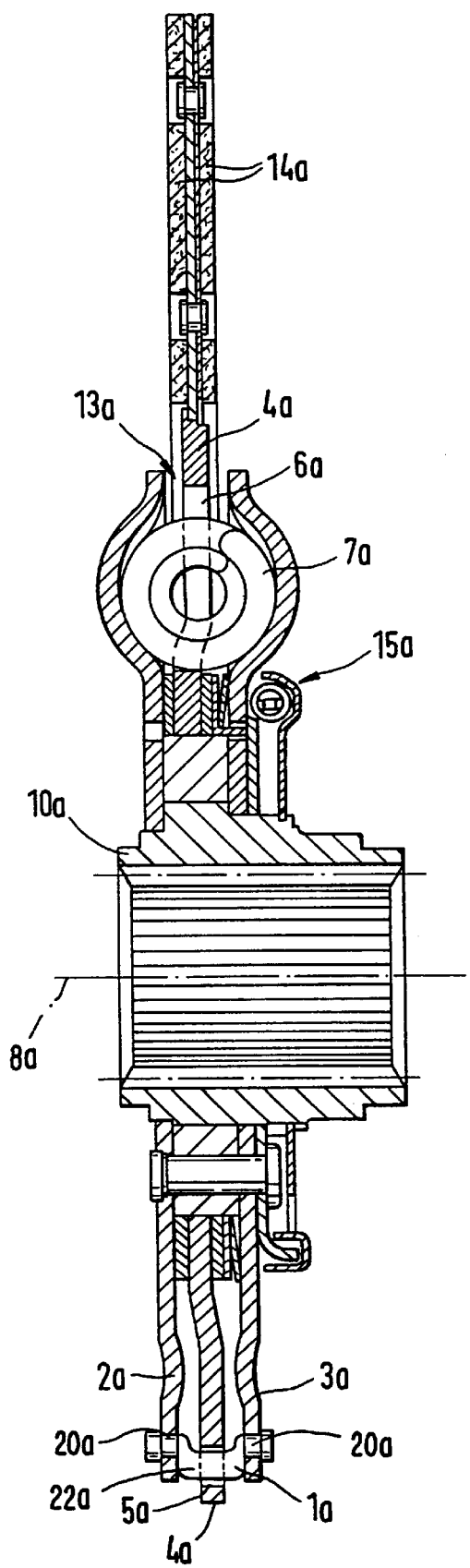

TORSIONAL VIBRATION DAMPING DEVICE IN THE DRIVE TRAIN OF A MOTOR VEHICLE

BACKGROUND OF THE INVENTION

1. Field of the Invention

The present invention relates to a torsional vibration damping device for use in the drive train of a motor vehicle having at least two rotationally connected coaxial cover plates which rotate about an axis of rotation within a certain angular range relative to a coaxial part located between the cover plates.

2. Description of the Related Art

Torsional vibration dampers are required to damp the rotational vibrations fundamentally occurring in internal combustion engines. These rotational vibration generate droning noises in the vehicle body and also generate noises in the downstream gearbox and differential of the vehicle. The elastic forces typically used to accept the rotational vibration and deliver a torque which is as even as possible must, on the one hand, be sufficiently small for effective damping and, on the other hand, must accept high accelerations or forces. A large rotational deflection and therefore a large angle of twist between the two relatively rotatable parts are therefore desirable in the torsional vibration damping device.

Prior art torsional vibration damping devices are known, for example, from German Patent Application P 39 22 730.8. This reference discloses a clutch disk with a torsional vibration damping device having a hub disk arranged between two cover plates which are rotationally fastened together and held apart at a fixed distance by flat distance pieces. The cover plates can be rotated relative to the hub disk about the axis of rotation within limits which are determined by the circumferential size of apertures in the hub disk for the passage of the distance pieces. The radial distance of the distance piece from the axis of rotation is substantially determined by strength considerations and is balanced against weight and space requirements of the cover plates and hub disk. On the one hand, arranging the distance pieces at a distance from the axis of rotation which is as large as possible is desirable in order to keep the forces on the connections to the cover plates as small as possible. On the other hand, an increase in the radial size of the cover plates is not desirable with respect to weight and space requirement of the clutch disk.

When a minimum material thickness for the joint region of the distance pieces in the cover plates is taken into account, it follows that—in the current prior art—the apertures extending in the peripheral direction must be located outside the circumferential region of the spring elements. That is, the maximum twist angle of torsional vibration damping devices of the prior art is limited to the angular range between two spring elements.

SUMMARY OF THE INVENTION

The object of the invention is, therefore, to provide a torsional vibration damping device which can execute a clearly larger rotational angle with the same strength and the same dimensions as the prior art devices.

A further object of the invention is to ensure substantially higher strength with the usual small rotational angles of conventional torsional vibration damping devices.

To achieve this object, the present invention comprises a distance piece for connecting the two cover plates having joint regions of the distance piece where the distance piece is connected to the cover plates and a connecting region of the distance piece between the joint regions which connects the two cover plates. The radial distance between the connection region of the distance piece and the axis of rotation differs from the radial distance between the joint region of the distance piece and the axis of rotation. This permits the connecting region of the distance elements to be accommodated, in a space-saving manner, radially outside the spring element region. In consequence, the maximum angle of twist is not limited to the angular range between two spring elements and can be clearly increased without impairing the strength of the torsional vibration damping device. Similarly, it is also possible to substantially increase the strength of a torsional vibration damping device if larger angles of twist are sacrificed.

The internally located part such, for example, as a hub disk arranged between the cover plates may be substantially circular and the distance pieces connecting the cover plates may be arranged such that the distance pieces extend radially outside the internally located part.

In a further embodiment, at least one aperture extends circumferentially over the periphery of the internally located part. The distance pieces are arranged such that they pass through the apertures. In this way, the internally located part can be made stronger in critical regions.

In addition, the aperture should be arranged radially outside the region of the spring elements in order to increase the angle of twist and, therefore, to circumferentially extend the aperture into the circumferential region of the spring elements.

The aperture may, for example, comprise an opening or cut-out of the internally located part, such as a slot extending in the circumferential direction or an elongated hole extending in the circumferential direction.

In another embodiment, this aperture is provided at an external periphery of the internally located part, where it can be produced particularly rapidly and at low cost.

In addition to maintaining the distance between the cover plates, the distance pieces may also be used to rotationally fix the cover plates to one another if the joint regions of the distance pieces are inserted into fitting openings in the cover plates.

Plug-in connections may be provided by means of which one or a plurality of distance pieces are connected to one or both of the cover plates. If the axial fastening of the cover elements is effected by another component, it is not necessary for the distance pieces to also axially fasten the cover plates and the plug-in connection may be used without further processing for the finally assembled torsional vibration damping device. The axial fastening may, for example, take place by a suitably designed frictional device. The fastening of a cover plate may, of course, also take place by a positive or form-fitting connection.

If the joint regions of the distance pieces are caulked into openings in the cover plates, a fastening device which prevents the cover plates from falling apart axially at the outside may be omitted.

In addition, it is advantageously possible to employ an embodiment such that at least one distance piece is configured in such a way that it interacts with a stop element of the internally located part. In this way, a stop device to protect from excessive twist is incorporated in the existing devices.

As an example, the connecting region of a distance piece may interact with the stop element of the internally located part.

In another embodiment, the stop element consists simply of a circumferential end surface of the aperture, by which means a suitable stop element can be applied to the internally located part without an additional operational step.

The position of the distance pieces relative to the spring element windows and the axis of rotation can, advantageously, be unambiguously determined by the shape of the joint region.

A further embodiment is then to design the joint region of a distance piece provided as part of the stop appliance so that the joint region is not rotationally symmetrical about an axis parallel to the rotational axis of the clutch disk. This prevents the distance piece from twisting when subjected to torque.

In yet another embodiment, the distance pieces are U-shaped such that the joint region and connecting region are radially separated from one another. The distance pieces consist of only one workpiece in this embodiment and are therefore assembled in a stronger and cheaper manner.

In an advantageous embodiment, distance pieces can be used which have at least two different cross-sections.

In addition, the central region of such a U-shaped distance piece should point substantially outward in the installed condition. By this means, a large radial distance can be achieved between the joint region and the connecting region for relatively little deformation of the distance piece. By this means, space is gained for large angles of twist or large material thicknesses and therefore high strength.

A central part of the U-shaped distance piece directed radially inward has the same advantage in another embodiment in which the distance pieces are applied at a radius which is smaller than that of the spring element windows. The decisive feature for the advantageous embodiment of the invention is that the aperture should be as far as possible from the spring element windows.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several view:

FIG. 1a is a partial sectional end view of a clutch disk with an embodiment of the torsional vibration damping device according to an embodiment of the present invention;

FIG. 1b is a longitudinal sectional view of the clutch disk of FIG. 1a;

FIG. 1c is an enlarged view of the area Ic circled in FIG. 1b;

FIG. 1d is an enlarged view of a distance piece according to another embodiment of the invention;

FIG. 2a is a longitudinal sectional view of a clutch disk with another embodiment of the torsional vibration damping device according to another embodiment of the present invention;

FIG. 2b is a partial section end view of the clutch disk of FIG. 2a;

DETAILED DESCRIPTION OF THE PRESENTLY PREFERRED EMBODIMENTS

Figure 2B:
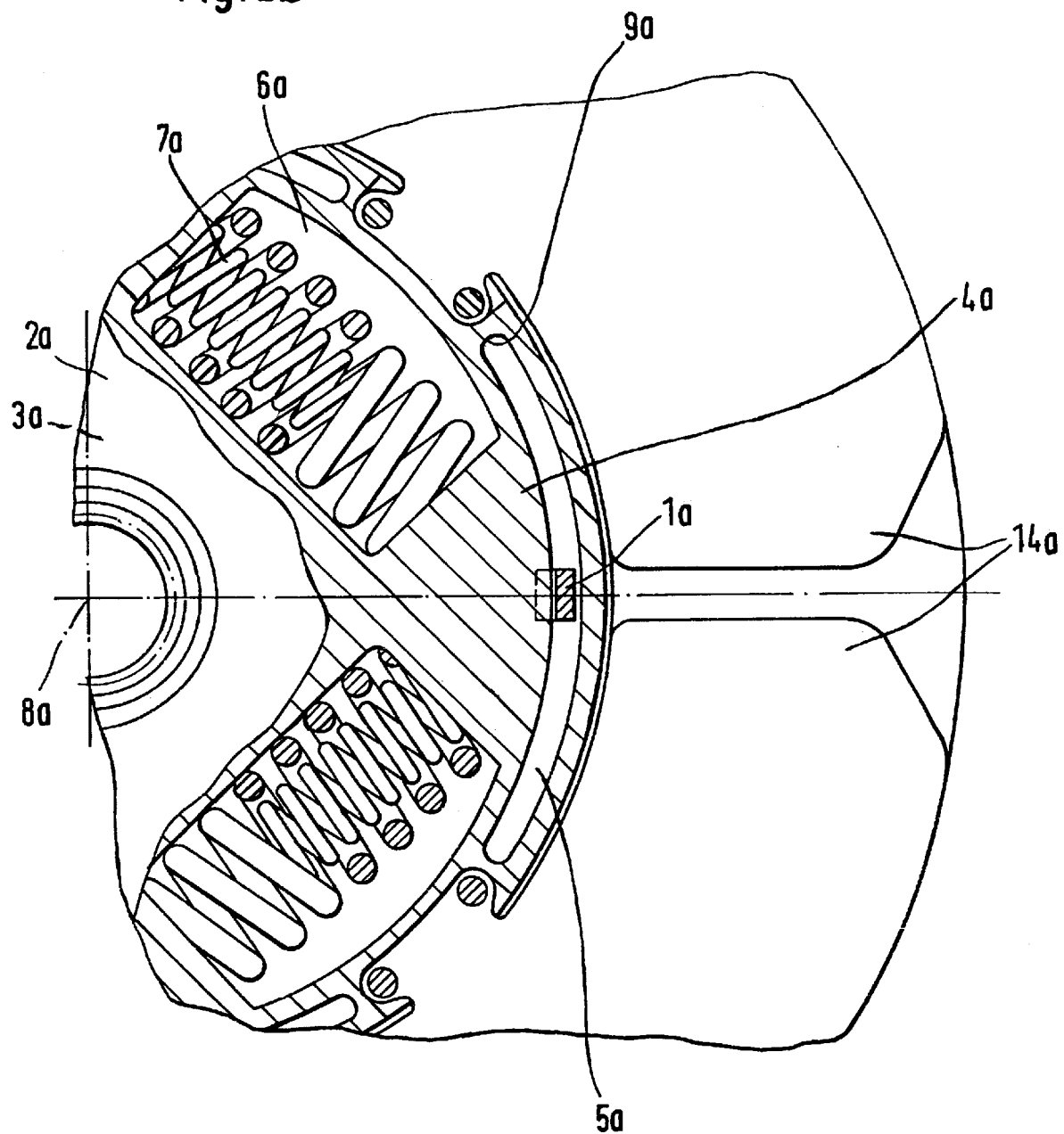

A clutch disk with a torsional vibration damping device according to an embodiment of the present invention is shown in FIGS. 1a, 1b, and 1c. A hub 10 connects the clutch disk to a gearbox shaft (not shown in the Figures) via splines, which extend in the direction of an axis of rotation 8 of the hub 10, so that the gearbox shaft is axially displaceable and rotationally fixed with respect to the hub 10. An annular hub disk 4 is connected to the hub 10 by splines 11 with a circumferential twist clearance 12, so that the annular hub disk 4 is to a large extent rotationally fixed to the hub 10, with the exception of the twist clearance 12. Two cover plates 2 and 3 surrounding the hub disk 4 are rotationally fixed to one another and are rotatable about the axis of rotation 8 relative to the hub disk 4. An on-load spring device 13 provides an elastic force to oppose this relative rotation between the cover plates 2, 3 and the hub disk 4 by circumferentially directed spring elements 7 which are arranged in spring element windows 6 in the hub disk 4 and in spring element windows 17 in the cover plates 2 and 3.

The rotational connection between the cover plates 2 and 3 is effected by distance pieces 1 having joining regions 20 which are joined via a positive connection into openings 32, 33 of the cover plates 2, 3, respectively such that the cover plate 2 is fixed with respect to rotation to cover plate 3. In an alternative embodiment shown in FIG. 1d, the distance pieces may be connected to the cover plates 2, 3 via plug-in connections, i.e., non-positive connections, if the axial fastening of the cover plates 2, 3 is effected by another component. If the joint regions 20 of the distance pieces 1 are caulked into the openings 32, 33 via a caulking 35, the need for another component which prevents the cover plates 2, 3 from falling apart axially is obviated. Each of the distance pieces 1 has a connecting region 22 which extends through an aperture 5 in the hub disk 4. The embodiment of the distance piece 1 presented in FIG. 1b and 1c is U-shaped so that the aperture 5 can be arranged radially outside the region of the spring element windows 6. In consequence, the apertures 5 can extend circumferentially into the circumferential region of the spring element windows 6. Stops may be provided as required by adapting a size of aperture 5 and spring characteristic. Instead of having stops, absolute pivoting freedom of the torsional vibration damping device may alternatively be realized. As an example of a stop which may be used and as indicated in FIG. 1a, end surfaces 9 of the ends of each aperture 5, together with the connecting regions 22 of the distance pieces 1, form a stop limitation which protects the torsional vibration damping device from excessive twist. On this point, it should be noted that a torque acts in operation on a distance piece 1 used as a stop element as soon as this distance piece 1 touches the end face a. As indicated for example in FIGS. 1a, however, the distance piece 1 can be applied by a joint region 20 which is not rotationally symmetrical, such as by elongated or multi-part joint regions, between the cover plates 2 and 3. The friction linings 14 are fastened on the outer periphery of the cover plate 3. Both cover plates 2, 3 are rotatably guided relative to the hub 10 by a support ring 16 at the inner diameter of the cover plate 3 in the radial direction. Arranged between the hub disk 4 and the cover plate 3 is an idling speed spring device 15 in which two further cover plates are effectively connected to a further hub disk by means of spring elements. In addition, a so-called entrained friction device is provided.

The function of the clutch disk with the torsional vibration damping device according to the invention is described as follows: The rotary vibrations of the drive are transmitted via the friction linings 14 to the cover plates 2 and 3 which are, in consequence, put into periodically accelerated rotational motion.

In idling operation, the rotational vibrations occurring in this embodiment are damped by the idling speed spring device 15. The coverplates 2, 3, the hub disk 4 and the spring elements 7 of the on-load spring device 13 may be regarded as a rigid unit during idling operation. The hub disk 4, along with the other components of the on-load spring device 13, rotates relative to the hub 10 within the twist clearance 12.

Under load, the spring elements 7 are subjected by the accelerated rotation mentioned above to circumferentially acting forces causing the spring elements 7 change their length in accordance with their spring characteristic. Because of this, the torsion on the cover plates 2 and 3 is introduced in the direction of the hub disk 4. While the cover plates 2 and 3 rotate relative to the hub disk 4, the distance pieces 1 move in and relative to the apertures 5 of the hub disk 4. Therefore, the circumferential length of the apertures 5 determines the maximum angle of twist. The reaction force of the spring elements 7 acts on the hub disk 4 and, after the twist clearance 12 has been used up, is transmitted from the hub disk 4 to the hub 10.

FIGS. 2a and 2b show a further embodiment of the present invention. In this embodiment, the friction linings 14a or the lining carriers with friction linings are fastened to a hub disk 4a. The cover plates 2a and 3a, as in the embodiment shown in FIG. 1, are joined together by distance pieces 1a and, therefore, the distance pieces again extend through the aperture 5a in the hub disk 4a. Instead of being located on the outer periphery of the hub disk 4, the aperture 5a of FIGS. 2a and 2b is a slot-shaped opening. In this case, torques and torsional vibrations are transmitted via the friction linings 14a to the hub disk 4a and then via the on-load spring device 13a to the cover plates 2a and 3a and the hub 10a.

The functional mode of the torsional vibration damping device of FIGS. 2a and 2b is substantially the same as in the first embodiment. While cover plates 2a and 3a and the internally located part, i.e., hub disk 4a, rotate against one another, the central sections or the connecting region 22a of the distance pieces 1a move in the aperture 5a and relative to the latter.

The aperture 5a can be offset radially outward by using U-shaped distance pieces 1a. As may be seen from the drawing, the aperture 5a may extend circumferentially over the circumferential region of the spring elements 7a. In this case, the material thicknesses in the cover plates 2a and 3a in the joint region 20a of the distance pieces 1a and also in the hub disk 4a in the region of the spring element windows 6a and 17a remain large.

Figure 3:
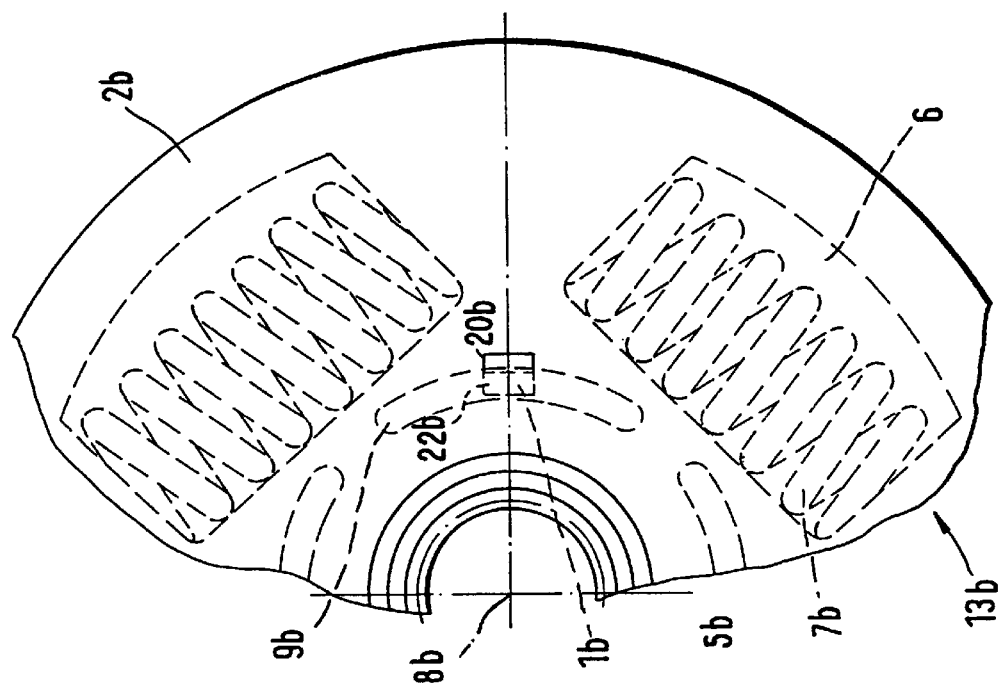
FIG. 3 is a partial sectional view of another embodiment of the torsional vibration damping device of the present invention with a radially internally located aperture.

A further embodiment is shown diagrammatically in FIG. 3 in which distance pieces 1b are provided radially within the region of the spring elements 7b and the spring element windows 6b and 17b.

As is made clear in the drawing, the connection or stop region 22b of the distance piece 1b must, in this case, be offset relative to the joint region 20b toward the axis of rotation 8b to retain the desired large twist angle at large material cross-sections. FIG. 3 also shows that the cross section area of the connection regions 22b may be different than the cross section area of the joint region 20b. Furthermore, the cross section of the joint region is asymmetrical about an axis parallel to the axis of rotation so that the distance piece is prevented from twisting when subjected to torque. In FIG. 3, the cross section is rectangular.

Figure 4:
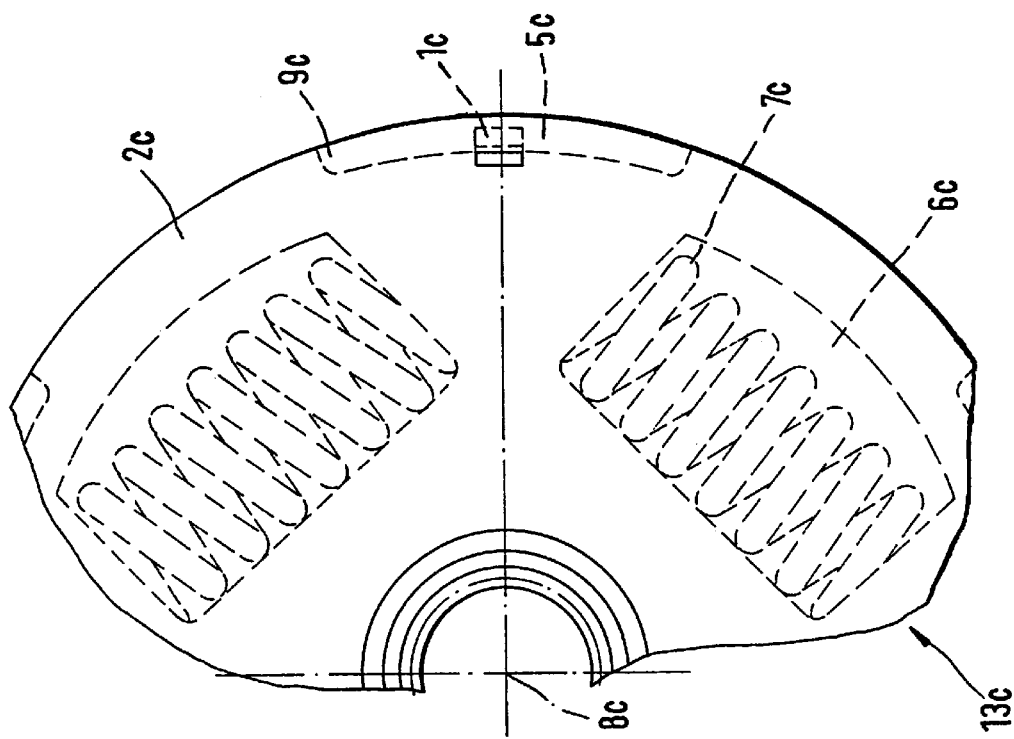
FIG. 4 is a partial sectional view of another embodiment of the torsional vibration damping device of the present invention with a large material cross-section.

The concept of the present invention may also be used exclusively for improved strength at relatively small twist angles. FIG. 4 shows, for example, the principle of an embodiment with an aperture 5c which is arranged peripherally outside the region of a spring element 7c, i.e. does not permit a clearly larger twist angle, in which however the joint region 20c and the connecting region or stop region 22c are also separated to remove the aperture 5c from the vicinity of the spring element window 6c.

As is apparent from the various embodiments of the distance pieces 1, 1a, 1b, 1c, the position of the distance piece relative to the spring element windows and the axis of rotation is determined by the shape of the joining region.

It is likewise possible to omit the aperture 5 and to use distance pieces 1c with joint and connecting regions applied at different radii which extend radially outside the internally located part or the hub disk. If aperture 5c is used in any form, it may also be arranged to be asymmetrical in order to take account of the different torques during overrun and under load.

The invention is not limited by the embodiments described above which are presented as examples only but can be modified in various ways within the scope of protection defined by the appended patent claims.

I claim:

1. A torsional vibration damping device in the drive train of a motor vehicle, comprising:

a first cover plate rotatably arranged for rotating about an axis of rotation;

a second cover plate fixed with respect to rotation to said first cover plate and arranged at an axial distance from said first cover plate;

a coaxial internally located part arranged between said first and second cover plates and rotatable about said axis of rotation relative to said first and second cover plates;

a spring element having a spring force circumferentially arranged between said internally located part and said first and second cover plates such that said internally located part is rotatable relative to said first and second cover plates against said spring force; and a plurality of discrete distance pieces axially arranged between said first and second cover plates for holding said first cover plate at said axial distance from said second cover plate, each of said plural distance pieces having a joint region proximate each axial end of said each of said plural distance pieces for connecting said distance piece to said first and second cover plates and a connecting region extending between said first and second cover plates, wherein said each of said plural distance pieces comprises a U-shaped configuration so that a first radial distance between said joint regions and said axis of rotation is different from a second radial distance between said connecting region and said axis of rotation, and wherein said internally located part comprises circumferentially extending apertures through which said plural distance pieces respectfully extend, said joint regions of said plural distance pieces being inserted into corresponding openings in said first and second cover plates.

2. The torsional vibration damping device of claim 1, wherein said internally located part is substantially circular.

3. The torsional vibration damping device of claim 1, wherein said each of said plural distance pieces extends radially outside said internally located part.

4. The torsional vibration damping device of claim 1, wherein said aperture is arranged radially outside a region of the spring element.

5. The torsional vibration damping device of claim 1, wherein said aperture comprises a slot incorporated in said internally located part.

6. The torsional vibration damping device of claim 1, wherein said aperture is arranged on an external periphery of said internally located part.

7. The torsional vibration damping device of claim 1, wherein at least one of said joint regions of said each of said plural distance pieces is connected to one of said first and second cover plates via a plug-in connection.

8. The torsional vibration damping device of claim 7, wherein said plug-in connection of said each of said plural distance pieces to said cover plates is retained in the assembled state of said torsional vibration damping device.

9. The torsional vibration damping device of claim 1, wherein said each of said plural distance pieces is connected non-positively to said cover plates.

10. The torsional vibration damping device of claim 1, wherein said each of said plural distance pieces is positively connected to said cover plates.

11. The torsional vibration damping device of claim 1, wherein said each of said distance pieces is fastened via a caulking to said cover plates.

12. The torsional vibration damping device of claim 1, wherein said internally located part comprises a stop element arranged for interacting with a corresponding one of said distance pieces.

13. The torsional vibration damping device as claimed in claim 12, wherein said connecting region of said corresponding one of said plural distance pieces interacts with said stop element of said internally located part.

14. The torsional vibration damping device of claim 12, wherein said internally located part comprises a circumferentially extending aperture through which said corresponding one of said plural distance pieces extends, and said stop element comprises an end surface of said aperture.

15. The torsional vibration damping device of claim 1, wherein said joint region of said distance piece comprises a joint region shape, wherein said joint region shape determines a position of said distance piece relative to said axis of rotation and relative to said spring element.

16. The torsional vibration damping device of claim 15, wherein said joint region shape is rotationally asymmetrical about an axis parallel to said axis of rotation.

17. The torsional vibration damping device of claim 1, wherein said each of said plural distance pieces comprises at least two different cross-sections along an axial length.

18. The torsional vibration damping device of claim 1, wherein a central region of said each of said plural distance piece with said U-shaped configuration is directed substantially radially outward.

19. The torsional vibration damping device of claim 1, wherein a central region of said each of said distance pieces with said U-shaped configuration is directed substantially radially outward.

* * * * *